(12) United States Patent
Lin et al.

(10) Patent No.: US 11,029,753 B2
(45) Date of Patent: Jun. 8, 2021

(54) HUMAN COMPUTER INTERACTION SYSTEM AND HUMAN COMPUTER INTERACTION METHOD

(71) Applicant: XRSPACE CO., LTD., Taoyuan (TW)

(72) Inventors: Yen-Hung Lin, Taoyuan (TW); Chieh-Kai Wang, Changhua County (TW); Shih-Hao Ke, New Taipei (TW); Wei-Chi Yen, Taipei (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 16/673,987

(22) Filed: Nov. 5, 2019

(65) Prior Publication Data

US 2021/0132684 A1    May 6, 2021

(51) Int. Cl.
*G06F 3/01* (2006.01)
*G06T 7/20* (2017.01)

(52) U.S. Cl.
CPC .............. *G06F 3/011* (2013.01); *G06T 7/20* (2013.01); *G06T 2207/30196* (2013.01)

(58) Field of Classification Search
CPC ...................................................... G06F 3/017
See application file for complete search history.

(56) References Cited

U.S. PATENT DOCUMENTS

| | | | |
|---|---|---|---|
| 2011/0148755 A1* | 6/2011 | Lee | G06F 3/017 345/156 |
| 2017/0220119 A1 | 8/2017 | Potts et al. | |
| 2017/0358139 A1 | 12/2017 | Balan et al. | |
| 2018/0279913 A1 | 10/2018 | Frasier et al. | |
| 2018/0285636 A1* | 10/2018 | Fei | G06K 9/00375 |
| 2019/0113966 A1 | 4/2019 | Connellan et al. | |

FOREIGN PATENT DOCUMENTS

| | | |
|---|---|---|
| CN | 106575151 | 4/2017 |
| CN | 107106032 | 8/2017 |
| CN | 107249497 | 10/2017 |
| CN | 109069933 | 12/2018 |
| CN | 109313495 | 2/2019 |
| CN | 109716062 | 5/2019 |

OTHER PUBLICATIONS

"Search Report of Europe Counterpart Application", dated May 20, 2020, p. 1-p. 11.
"Office Action of Taiwan Counterpart Application", dated Dec. 14, 2020, p. 1-p. 15.

* cited by examiner

*Primary Examiner* — Roy P Rabindranath
(74) *Attorney, Agent, or Firm* — JCIP Global Inc.

(57) ABSTRACT

A human computer interaction system and a human computer interaction method are provided. The human computer interaction system includes a first sensor, a second sensor and a processor. The processor obtains first motion sensing data of the first operating portion from the first sensor, obtains second motion sensing data of the second operating portion from the second sensor different from the first operating portion, and determines an event according to both the first motion sensing data and the second motion sensing data. Accordingly, a hybrid motion tracking method for multiple operating portion of the user is provided.

20 Claims, 3 Drawing Sheets

US 11,029,753 B2

HUMAN COMPUTER INTERACTION SYSTEM AND HUMAN COMPUTER INTERACTION METHOD

BACKGROUND OF THE DISCLOSURE

1. Field of the Disclosure

The present disclosure generally relates to a method for tracking the motion of user, in particular, to a human computer interaction system and a human computer interaction method of the user.

2. Description of Related Art

To provide an intuitive operation on an electronic apparatus (such as a game player, a computer, a smartphone, a smart appliance, etc.), the motion of user may be detected, to directly operate the electronic apparatus according to the motion of the user.

In conventional approaches, some electronic apparatuses may allow multiple human body portions (such as hands, legs, a head, etc.) of the user to control the operation of these electronic apparatuses, and the motion of these human body portions may be tracked. However, these electronic apparatuses merely provide one way to detect the motion of multiple human body portions at the same time. For example, a virtual reality (VR) product provides handheld controllers, and each handheld controller includes an inertial measurement unit (IMU) to track the motion of the hands of user. Sometimes, one motion tracking manner may be a limitation for some users because of habit or desire.

SUMMARY OF THE DISCLOSURE

Accordingly, the present disclosure is directed to a human computer interaction system and a human computer interaction method, in which different human body portions can be tracked with different sensors.

In one of the exemplary embodiments, a human computer interaction method includes, but not limited to, the following steps. First motion sensing data is obtained, where the first motion sensing data is related to a first operating portion of a user and generated based on a first sensor. Second motion sensing data is obtained, where the second motion sensing data is related to a second operating portion of the user different from the first operating portion and generated based on a second sensor. An event is triggered according to both the first motion sensing data and the second motion sensing data.

In one of the exemplary embodiments, a human computer interaction system includes, but not limited to, a first sensor, a second sensor, and a processor. The first sensor obtains first motion sensing data related to a first operating portion of a user. The second sensor obtains second motion sensing data related to a second operating portion of the user different from the first operating portion. The processor obtains the first motion sensing data of the first operating portion based on the image data obtained from the first sensor, obtains the second motion sensing data of the second operating portion based on the motion of the second sensor, and trigger an event according to both the first motion sensing data and the second motion sensing data.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
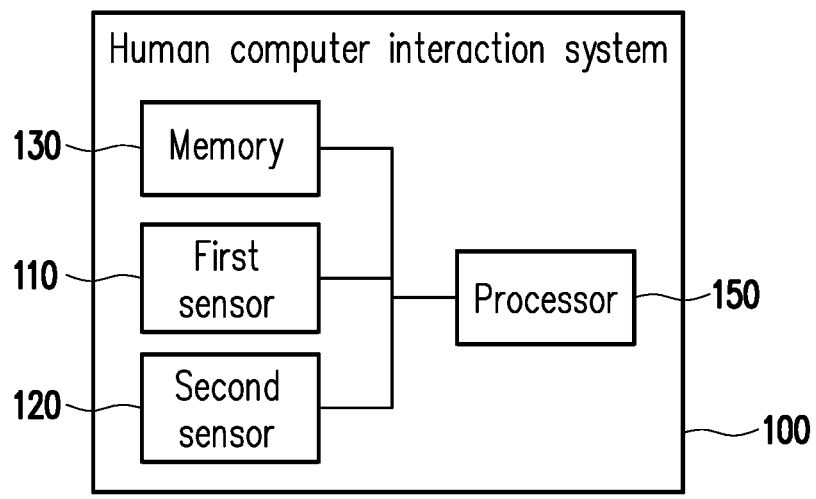
FIG. 1 is a block diagram illustrating a human computer interaction system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating a human computer interaction system 100 according to one of the exemplary embodiments of the disclosure. Referring to FIG. 1, the human computer interaction system 100 includes, but not limited to, one or more first sensors 110, one or more second sensors 120, a memory 130 and a processor 150. In one embodiment, the human computer interaction system 100 can be adapted for VR, AR, MR, XR or other reality related technology. In some embodiments, the human computer interaction system 100 can be adapted for operating an external apparatus (such as a computer, a game player, a smart phone, an in-dash system, a smart appliance, etc.).

In one embodiment, the first sensor 110 may be a camera, such as a monochrome camera or a color camera, a deep camera, a video recorder, or other image sensor capable of capturing images.

In some embodiments, the first sensor 110 may be used to capture toward one or more operating portions of a user, to generate image data including operating portions of the user. For example, one or more operating portions may include a face, a hand, a head, an ankle, a leg, a waist or other human body portions of the user.

In one embodiment, the human computer interaction system 100 further includes a head-mounted display (HMD), and the first sensor 110 is embedded in the HMD. In some embodiment, the first sensor 110 can be placed at any place where the first sensor 110 can capture the target operating portion.

In another embodiment, the first sensor 110 may be an accelerometer, a gyroscope, a magnetometer, a laser sensor, an inertial measurement unit (IMU), an infrared ray (IR) sensor, or any combination of aforementioned motion sensors. The first sensor 110 is used for sensing the motion itself, and acted with the operating portion in which itself is placed. For example, the first sensor 110 detects the position in a 3-dimension space and the rotation situation itself.

In some embodiments, the human computer interaction system 100 further includes one or more controllers (for example, handheld controllers, wearable apparatuses (such as wearable controllers, smart watches, ankle sensors, a HMD, or the likes.)), and the first sensor 110 is embedded in the controller. The operating portion of the user may hold, wear, or carry the controller. The first sensor 110 may be moved or rotated along with the operating portion of the user. Therefore, the motion of the first sensor 110 may represent the motion of the operating portion.

In still another embodiment, the first sensor 110 may include both of the aforementioned image sensor and motion sensor.

Similarly, the second sensor 120 may be any type of aforementioned image sensors or any type of aforementioned motion sensors. In some embodiments, the second sensor 120 may include both of the image sensor and the motion sensor. It should be noted that the difference between the second sensor 120 and the first sensor 110 is that the second sensor 120 is used to sense the motion of another operating portion of the user different from the operating portion sensed by the first sensor 110.

Memory 130 may be any type of a fixed or movable Random-Access Memory (RAM), a Read-Only Memory (ROM), a flash memory or a similar device or a combination of the above devices. The memory 130 can be used to store program codes, device configurations, buffer data or permanent data (such as motion sensing data, image data, operating commands, etc.), and these data would be introduced later.

The processor 150 is coupled to the memory 130, and the processor 150 is configured to load the program codes stored in the memory 130, to perform a procedure of the exemplary embodiment of the disclosure. In some embodiments, functions of the processor 150 may be implemented by using a programmable unit such as a central processing unit (CPU), a microprocessor, a microcontroller, a digital signal processing (DSP) chip, a field programmable gate array (FPGA), etc. In one embodiment, the functions of the processor 150 may also be implemented by an independent electronic device or an integrated circuit (IC), and operations of the processor 150 may also be implemented by software.

It should be noticed that, the processor 150 may or may not be disposed at the same apparatus with the first sensor 110 or the second sensor 120. However, the apparatuses respectively equipped with the first sensor 110, the second sensor 120 and the processor 150 may further include communication transceivers with compatible communication technology, such as Bluetooth, Wi-Fi, IR, or physical transmission line, to transmit/receive data with each other.

To better understand the operating process provided in one or more embodiments of the disclosure, several embodiments will be exemplified below to elaborate the operating process of the human computer interaction system 100. The devices and modules in the human computer interaction system 100 are applied in the following embodiments to explain the control method provided herein. Each step of the control method can be adjusted according to actual implementation situations and should not be limited to what is described herein.

Figure 2:
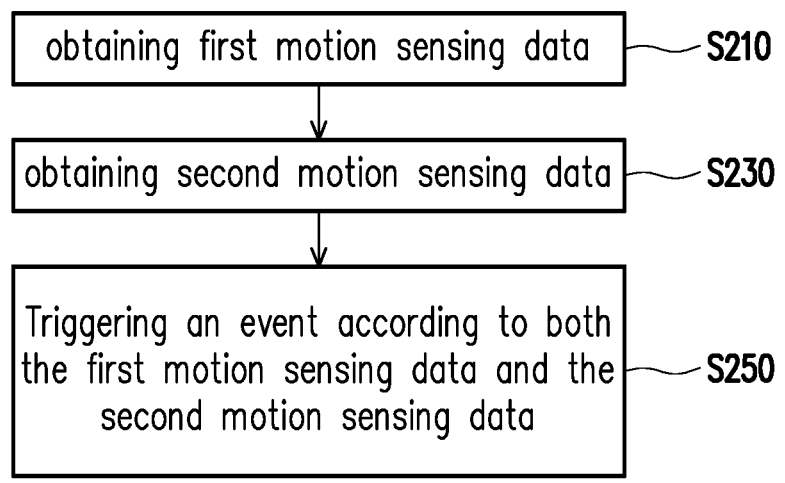
FIG. 2 is a flowchart illustrating a human computer interaction method according to one of the exemplary embodiments of the disclosure.

FIG. 2 is a flowchart illustrating a human computer interaction method according to one of the exemplary embodiments of the disclosure. Referring to FIG. 2, the processor 150 may obtain first motion sensing data from the first sensor 110 (step S210). Specifically, the first motion sensing data is related to a first operating portion of a user, and is generated based on the first sensor 110. The processor 150 may predefine one or more human body portions of the user, or select one or more human body portions according to the selection from the user, to determine as the type of the first operating portion. For example, the right hand would be the default first operating portion. For another example, the human computer interaction system 100 provides a display to present a UI, the UI shows several human body portions, and the selection of the user on the UI could be determined as the first operating portion.

In one embodiment, after receiving image (which may include a sequence of captured images captured at different time points) and/or data (which may include a sequence of sensing data obtained at different time points) obtained from the first sensor 110, the processor 150 may detect whether the first operating portion is detected in the image or the data. In some embodiments, the first operating portion in the image would be identified through a machine learning technology (such as deep learning, artificial neural network (ANN), or support vector machine (SVM), etc.). In another embodiment, the first operating portion may be identified through other object identification technologies, such as the binary classifier, the adaptive boosting (Adaboost), etc. In still another embodiment, the variation of the data obtained from the motion sensor at different time points may be determined. If the value of the variation between two time points is larger than a predefined threshold, the processor 150 may determine the first operating portion is moving. On the other hand, the processor 150 may determine the first operating portion is not moving or the first sensor 110 has left from the first operating portion.

In one embodiment, in response to the first operating portion being detected in the image, the processor 150 may generate the first motion sensing data according to the motion of the first operating portion in the image. In some embodiments, the sensing strength and the pixel position corresponding to the first operating portion in the image can be used for estimating depth information of the first operating portion (i.e., a distance relative to the first sensor 110 or other reference apparatuses) and estimating 2D position of the first operating portion at a plane parallel to the first sensor 110. The processor 150 can generate a 3D position in a predefined coordinate system according to the distance and the 2D position of the first operating portion. The processor 150 may further estimate the displacement and the rotation data of the first operating portion according to multiple positions at different time points, so as to generate a 6-degree of freedom (6-DoF) data (which would be considered as the first motion sensing data). In some embodiments, 3-DoF data, a relative position and/or displacement of the first operating portion in the 2D/3D space could be the first motion sensing data.

In another embodiment, the first motion sensing data could be 3-DoF data, 6-DoF data, a relative position and/or displacement of the first operating portion in the 2D/3D space based on the data obtained from the first sensor 110 in which the first sensor 110 is the motion sensor.

In still another embodiment, the first sensor 110 includes the image sensor and the motion sensor, and the first motion sensing data may be generated based on both the images of the image from the image sensor and the data from the motion sensor. For example, the image could be used for estimating the location of the first operating portion, and the data could be used for estimating the rotation situation of the first operating portion. For another example, both the image and the data can be used for determining the position of the first operating portion.

On the other hand, the processor 150 may obtain second motion sensing data (step S230). Specifically, the second motion sensing data is related to a second operating portion of the user different from the first operating portion. For example, the first operating portion is the right hand, and the second operating portion is the left hand. In one embodiment, the generation of the second motion sensing data from the second sensor 120 may be referred to the generation of the first motion sensing data from the first sensor 110. It means the second motion sensing data could be generated based on image and/or data obtained from the second sensor 120. For example, the second sensor 120 is an IMU and is embedded in a handheld controller for left hand, and the IMU may obtain the acceleration, rotation (which may include orientation and angular velocity), and magnetic field. The sensing result of the IMU could be used to estimate the pose and the rotation data of the left hand, so as to determine as the second motion sensing data.

Figure 3A:
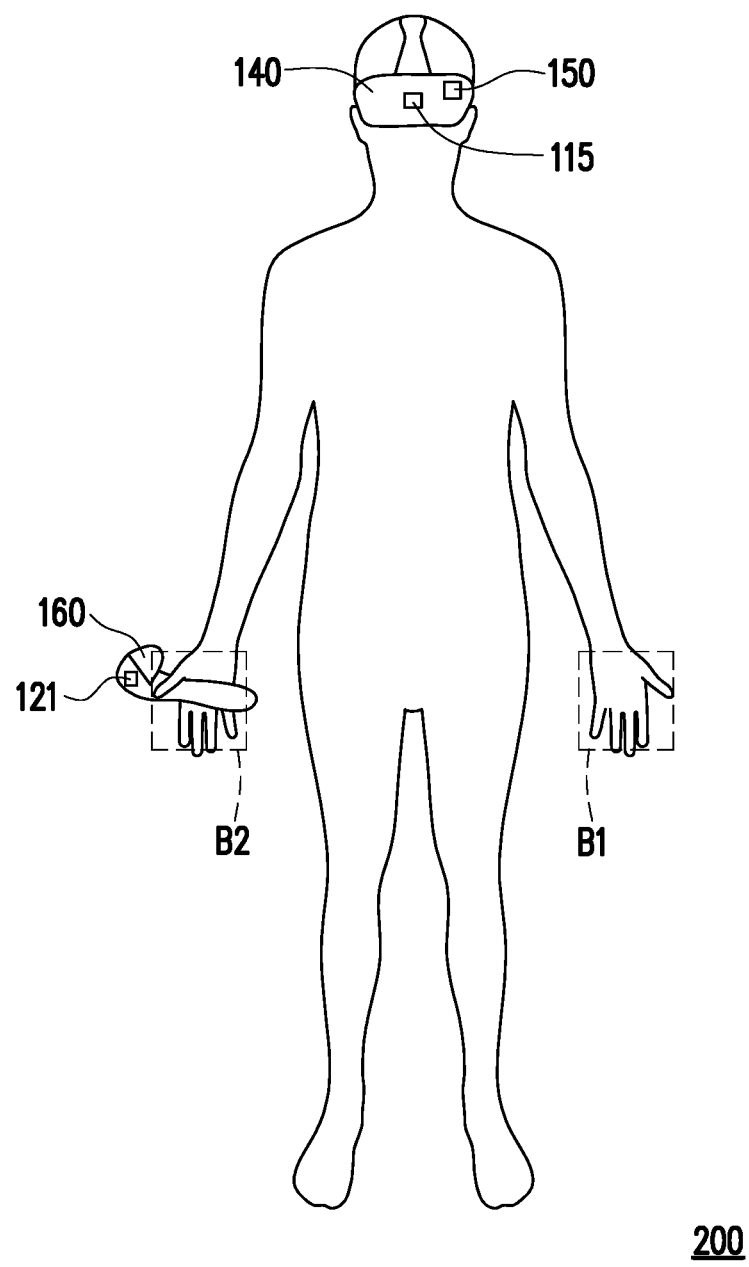
FIG. 3A is a schematic diagram illustrating a human computer interaction system according to one of the exemplary embodiments of the disclosure.

FIG. 3A is a schematic diagram illustrating a human computer interaction system 200 according to one of the exemplary embodiments of the disclosure. Referring to FIG. 3A, the human computer interaction system 200 includes a HMD 140 and a handheld controller 160 for the right hand. A stereo camera 115 (i.e., the first sensor 110 and/or the second sensor 120) and the processor 150 are embedded in the HMD 140, and the stereo camera 115 may be configured to capture camera images toward the operating portion B1 (i.e. the left hand of the user) and the operating portion B2 (i.e. the right hand of the user), to determine the motion sensing data of the operating portion B1 and/or the motion sensing data of the operating portion B2. In addition, IMU 121 (i.e., the second sensor 120) is embedded in the handheld controller 160, to obtain the motion sensing data of the operating portion B2.

Figure 3B:
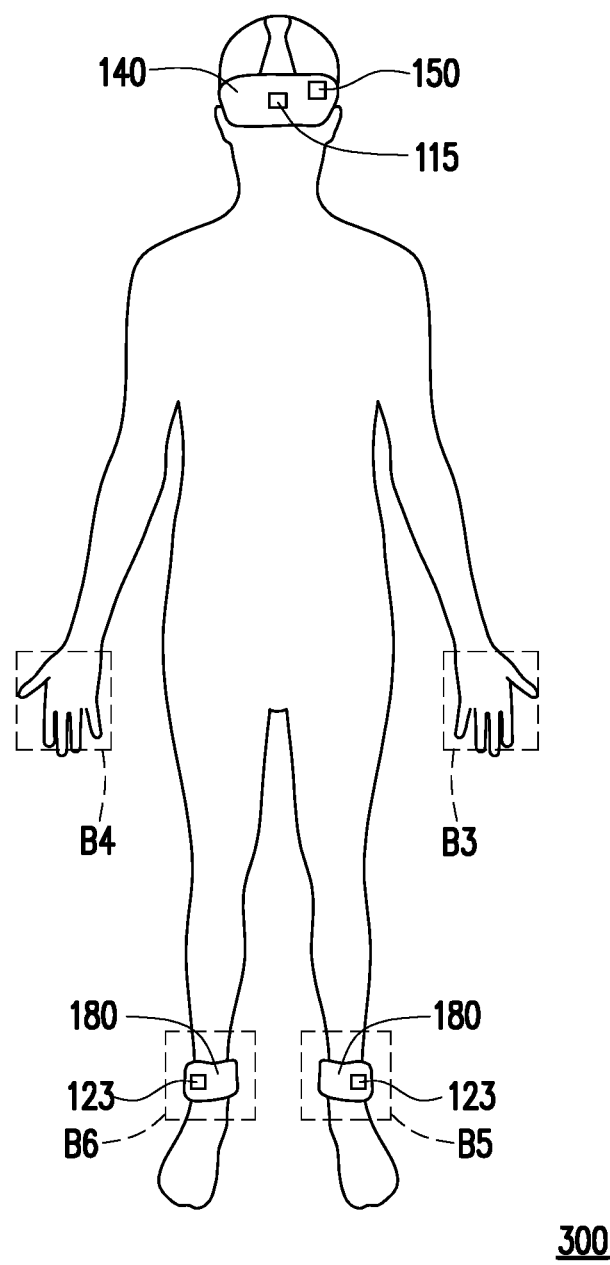
FIG. 3B is a schematic diagram illustrating another human computer interaction system according to one of the exemplary embodiments of the disclosure.

FIG. 3B is a schematic diagram illustrating another human computer interaction system 300 according to one of the exemplary embodiments of the disclosure. Referring to FIG. 3B, the human computer interaction system 300 includes a HMD 140 and two ankle sensors 180 for two ankles. The stereo camera 115 may be configured to capture camera images toward the operating portions B3 and B4 (i.e. the left and right hands of the user), to determine the motion sensing data of the operating portions B3 and B4, respectively. IMUs 123 (i.e., the first sensor 110 and/or the second sensor 120) is embedded in the ankle sensors 180, to obtain the motion sensing data of the operating portions B5 and B6 (i.e. the right and left ankles of the user), respectively.

It should be noticed that the operating portions tracked by the first sensor 110 or the second sensor 120 may be varied based on actual requirement.

In one embodiment, the human computer interaction system 100 may provide more than one controller respectively embedded with the first sensor 110 and/or the second sensor 120. The processor 150 may determine which controller is used by the user, so as to determine which operating portion of the user would be tracked. The processor 150 may determine whether the image from the image sensor and/or the data from the motion sensor is reliable from the sensing results of the first sensor 110 and/or the second sensor 120.

In one embodiment, the processor 150 may determine whether an image analysis result related to the motion of the first/second operating portion of the user is reliable. The image analysis result is determined based on the images captured from the image sensor of the first/second sensor 110/120. In one embodiment, if the first/second operating portion exists in the image captured from the first/second sensor 110/120, the processor 150 may determine the image analysis result for the image sensor is reliable, so as to use the images captured from the image sensor as the first/second motion sensing data. On the other hand, in one embodiment, if the first/second operating portion does not exist in the image captured from the image sensor, the processor 150 may determine the image analysis result for the image sensor is unreliable, so as to use the data obtained from the motion sensor of first/second sensor 110/120 as the first/second motion sensing data.

In another embodiment, the processor 150 may determine whether a data analysis result related to the motion of the first/second operating portion of the user is reliable. The data analysis result is determined based on the data obtained from the motion sensor of the first/second sensor 110/120. In one embodiment, if the position and the orientation of the motion sensor (i.e., the sensing result) are not the same or their variations are larger than a threshold for a time period, the processor 150 may determine the data analysis result for the motion sensor is reliable, so as to use the data obtained from the motion sensor as the first/second motion sensing data, or to use both the data from the motion sensor and the images from the image sensor to determine the first/second motion sensing data. On the other hand, in one embodiment, if the position and the orientation of the motion sensor are the same or their variations are less than the threshold for the time period, the processor 150 may determine the data analysis result for the motion sensor is unreliable, so as to use the image captured from the image sensor of the first/second sensor 110/120 as the first/second motion sensing data.

In some embodiments, the processor 150 may determine the image analysis result related to the motion of the first operating portion of the user is reliable, and determine whether the data analysis result related to the motion of the second operating portion of the user is reliable. In some embodiments, the processor 150 may determine the data analysis result related to the motion of the first operating portion of the user is reliable, and determine whether the image analysis result related to the motion of the second operating portion of the user is reliable.

In one embodiment, the processor 150 may determine whether an operation is detected on a controller embedded with the first/second sensor 110/120. The controller may include an input apparatus such as a button, a switch, a touch panel, etc. The controller can report the input event of the operation by the user received by the input apparatus to the processor 150. The input invent may be that, for example, the button is pressed, a switch is pushed, or a specific position on the touch panel is touched by the finger of the user. If the processor 150 does not receive the input event for a second time period, and the second time period exceeds a second idle time threshold, the processor 150 may determine the operation of the user is not detected, so as to determine the data analysis result for the motion sensor is unreliable. On the other hand, if the second time period is less than the second idle time threshold, the processor 150 may determine the operation of the user is detected, so as to determine the data analysis result for the motion sensor is reliable.

In one embodiment, in response to the data analysis result for the motion sensor is reliable, the processor 150 may determine the operating portion of the user acted with the motion sensor is the tracking target. On the other hand, in response to the data analysis result for the motion sensor is unreliable, the processor 150 may determine the controller embedded with the motion sensor of the first/second sensor 110/120 is not used by the user right now, and the processor 150 may obtain the first/second motion sensing data based on the image obtained from the image sensor of the first/second sensor 110/120.

It should be noticed that, in some embodiments, even the motion of the first/second sensor 110/120 is inactive or the operation is not detected on the controller embedded with the first/second sensor 110/120 for a while (such as the time exceeds the first or the second idle time threshold), the processor 150 may still obtain the first/second motion sensing data based on the motion of the first/second sensor 110/120.

Back to FIG. 2, the processor 150 may trigger an event according to both the first motion sensing data and the second motion sensing data (step S250). In one embodiment, the event is related to one or more commands for controlling a virtual object in a virtual environment or a real object in a real environment. The command may be a movement command of the corresponding body portions of an avatar, an interaction behavior (such as touching, throwing, hitting behaviors, etc.) with one or more virtual objects in the virtual environment, or an operating function (such as power off, page up, navigation, etc.) of an external apparatus (such as a computer, a game player, a smart phone, an in-dash system, a smart appliance, etc.) in the real environment.

Taking FIG. 3A as an example, the left and right hands of an avatar may move or rotation according to the motion sensing data of the operating portions B1 and B2 based on the image data of the stereo camera 115 and the motion of the IMU 121, respectively. Taking FIG. 3B as an example, the left and right hands of an avatar may move or rotation according to the motion sensing data of the operating portions B3 and B4 based on the image data of the stereo camera 115, respectively. In addition, the left and right ankles of the avatar may move or rotation according to the motion sensing data of the operating portions B5 and B6 based on the motion of the IMUS 123, respectively. Therefore, two motion tracking manner (the image sensing and the motion sensing) may be implemented at the same time.

It should be noted that more than one command may be used to trigger the event. For example, the wave motion of the left hand may correspond to five commands to, respectively, remove five virtual objects from the virtual environment in order in the VR mode, may correspond to two commands to control two real objects at the same time (for example, to turn on a real television and turn off a real computer) in the AR mode, or may correspond to a sequence of commands (for example, to turn on a real recorder, wait ten seconds, and turn off the real recorder).

In another embodiment, the event is related to one or more commands for controlling the setting, the interrupt, and/or the operation of the application or the operating system executed by the processor 150. For example, the event may be the change of the scenarios, the change of operating modes, existing from the game, stopping the game, turning off the human computer interaction system 100, etc. However, the event would be adapted for other applications based on the actual requirements, and the disclosure is not limited thereto.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A human computer interaction method, comprising:
obtaining first motion sensing data based on a first sensor, wherein the first motion sensing data is related to a first operating portion of a user and generated based on a determination whether an analysis result of a motion of the first operating portion based on one of a first motion sensor and a first image sensor is reliable, the first sensor comprises the first image sensor and the first motion sensor, the first motion sensor is acted with the first operating portion of the user, and the first image sensor captures images of the first operating portion of the user, and the step of obtaining the first motion sensing data further comprises:
using the images captured from the first image sensor as the first motion sensing data in response to the analysis result of the first operating portion of the user based on the first image sensor being reliable; and
using data obtained from the first motion sensor as the first motion sensing data in response to the analysis result of the first operating portion of the user based on the first image sensor being unreliable;
obtaining second motion sensing data, wherein the second motion sensing data is related to a second operating portion of the user different from the first operating portion and generated based on a second sensor; and
triggering an event according to both the first motion sensing data and the second motion sensing data.

2. The human computer interaction method according to claim 1, wherein the second sensor is an image sensor, and the second sensor captures image of the second operating portion of the user.

3. The human computer interaction method according to claim 1, wherein both of the images captured from the first image sensor and the data obtained from the first motion sensor are used as the first motion sensing data.

4. The human computer interaction method according to claim 3, wherein the second sensor comprises a second motion sensor and a second image sensor, the second motion sensor is acted with the second operating portion of the user, the second image sensor captures image of the second operating portion of the user, and both of images captured from the second image sensor and data obtained from the second motion sensor are used as the second motion sensing data.

5. The human computer interaction method according to claim 1, wherein the analysis result comprises a first image analysis result, and the step of obtaining the first motion sensing data further comprises:
determining whether the first image analysis result is reliable, wherein the first image analysis result is related to the motion of the first operating portion of the user and determined based on the images captured from the first image sensor;
using the images captured from the first image sensor as the first motion sensing data in response to the first image analysis result of the first operating portion of the user being reliable; and
using the data obtained from the first motion sensor as the first motion sensing data in response to the first image analysis result of the first operating portion of the user being unreliable.

6. The human computer interaction method according to claim 5, wherein the second sensor comprise a second motion sensor and a second image sensor, the second motion sensor is acted with the second operating portion of the user, the second image sensor captures images of the second operating portion of the user, and the step of obtaining the second motion sensing data comprises:
- determining whether a second image analysis result is reliable, wherein the second image analysis result is related to the motion of the second operating portion of the user and determined based on the images captured from the second image sensor;
- using the images captured from the second image sensor as the second motion sensing data in response to the second image, analysis result of the second operating portion of the user being reliable; and
- using data obtained from the second motion sensor as the second motion sensing data in response to the second image analysis result of the second operating portion of the user being unreliable.

7. The human computer interaction method according to claim 5, wherein the second sensor comprise a second motion sensor and a second image sensor, the second motion sensor is acted with the second operating portion of the user, the second image sensor captures images of the second operating portion of the user, and the step of obtaining the second motion sensing data comprises:
- determining whether a first data analysis result is reliable, wherein the first data image analysis result is related to the motion of the second operating portion of the user and determined based on the images captured from the second image sensor;
- using the data captured from the second motion sensor as the second motion sensing data in response to the first data analysis result of the second operating portion of the user being reliable; and
- using the images captured from the second image sensor as the second motion sensing data in response to the first data analysis result of the second operating portion of the user being unreliable.

8. The human computer interaction method according to claim 1, wherein the analysis result comprises a second data analysis result, and the step of obtaining the first motion sensing data further comprises:
- determining whether the second data analysis result is reliable, wherein the second data analysis result is related to the motion of the first operating portion of the user and determined based on data obtained from the first motion sensor;
- using the data obtained from the first motion sensor as the first motion sensing data in response to the second data analysis result of the first operating portion of the user being reliable; and
- using the images captured from the first image sensor as the first motion sensing data in response to the second data analysis result of the first operating portion of the user being unreliable.

9. The human computer interaction method according to claim 8, wherein the second sensor comprise a second motion sensor and a second image sensor, the second motion sensor is acted with the second operating portion of the user, the second image sensor captures images of the second operating portion of the user, and the step of obtaining the second motion sensing data comprises:
- determining whether a third data analysis result is reliable, wherein the third data analysis result is related to the motion of the second operating portion of the user and determined based on data obtained from the second motion sensor;
- using data obtained from the second data sensor as the second motion sensing data in response to the third data analysis result of the second operating portion of the user being reliable; and
- using the images captured from the second image sensor as the second motion sensing data in response to the third image analysis result of the second operating portion of the user being unreliable.

10. The human computer interaction method according to claim 1, wherein the event is related to at least one command for controlling a virtual object in a virtual environment or a real object in a real environment.

11. A human computer interaction system, comprising:
- a first sensor, comprising a first image sensor and a first motion sensor, wherein the first motion sensor is acted with a first operating portion of a user, and the first image sensor captures images of the first operating portion of the user;
- a second sensor; and
- a processor, configured to perform:
  - obtaining first motion sensing data of a first operating portion from the first sensor, wherein the first motion sensing data related to the first operating portion is generated based on a determination whether an analysis result of a motion of the first operating portion based on one of the first motion sensor and the first image sensor is reliable, and the processor is further configured to perform:
    - using the images captured from the first image sensor as the first motion sensing data in response to the analysis result of the first operating portion of the user based on the first image sensor being reliable; and
    - using data obtained from the first motion sensor as the first motion sensing data in response to the analysis result of the first operating portion of the user based on the first image sensor being unreliable;
  - obtaining second motion sensing data of the second operating portion from the second sensor different from the first operating portion; and
  - triggering an user input according to both the first motion sensing data and the second motion sensing data.

12. The human computer interaction system according to claim 11, wherein an image sensor, and the second sensor captures image of the second operating portion of the user.

13. The human computer interaction system according to claim 11, wherein both of the images captured from the first image sensor and the data obtained from the first motion sensor are used as the first motion sensing data.

14. The human computer interaction system according to claim 13, wherein the second sensor comprises a second motion sensor and a second image sensor, the second motion sensor is acted with the second operating portion of the user, the second image sensor captures image of the second operating portion of the user, and both of images captured from the second image sensor and data obtained from the second motion sensor are used as the second motion sensing data.

15. The human computer interaction system according to claim 11, wherein the analysis result comprises a first image analysis result, and the processor is configured to perform:
- determining whether the first image analysis result is reliable, wherein the first image analysis result is related to the motion of the first operating portion of the user and determined based on the images captured from the first image sensor;

using the images captured from the first image sensor as the first motion sensing data in response to the first image analysis result of the first operating portion of the user being reliable; and using the data obtained from the first motion sensor as the first motion sensing data in response to the first image analysis result of the first operating portion of the user being unreliable.

16. The human computer interaction system according to claim 15, wherein the second sensor comprise a second motion sensor and a second image sensor, the second motion sensor is acted with the second operating portion of the user, the second image sensor captures images of the second operating portion of the user, and the processor is configured to perform:

determining whether a second image analysis result is reliable, wherein the second image analysis result is related to the motion of the second operating portion of the user and determined based on the images captured from the second image sensor;

using the images captured from the second image sensor as the second motion sensing data in response to the second image analysis result of the second operating portion of the user being reliable; and using data obtained from the second motion sensor as the second motion sensing data in response to the second image analysis result of the second operating portion of the user being unreliable.

17. The human computer interaction system according to claim 5, wherein the second sensor comprise a second motion sensor and a second image sensor, the second motion sensor is acted with the second operating portion of the user, the second image sensor captures images of the second operating portion of the user, and the processor is configured to perform:

determining whether a first data analysis result is reliable, wherein the first data image analysis result is related to the motion of the second operating portion of the user and determined based on the images captured from the second image sensor;

using the data captured from the second motion sensor as the second motion sensing data in response to the first data analysis result of the second operating portion of the user being reliable; and using the images captured from the second image sensor as the second motion sensing data in response to the first data analysis result of the second operating portion of the user being unreliable.

18. The human computer interaction system according to claim 11, wherein the analysis result comprises a second data analysis result, and the processor is configured to perform:

determining whether the second data analysis result is reliable, wherein the second data analysis result is related to the motion of the first operating portion of the user and determined based on data obtained from the first motion sensor;

using the data obtained from the first motion sensor as the first motion sensing data in response to the second data analysis result of the first operating portion of the user being reliable; and using the images captured from the first image sensor as the first motion sensing data in response to the second data analysis result of the first operating portion of the user being unreliable.

19. The human computer interaction system according to claim 18, wherein the second sensor comprise a second motion sensor and a second image sensor, the second motion sensor is acted with the second operating portion of the user, the second image sensor captures images of the second operating portion of the user, and the processor is configured to perform:

determining whether a third data analysis result is reliable, wherein the third data analysis result is related to the motion of the second operating portion of the user and determined based on data obtained from the second motion sensor;

using data obtained from the second data sensor as the second motion sensing data in response to the third data analysis result of the second operating portion of the user being reliable; and using the images captured from the second image sensor as the second motion sensing data in response to the third image analysis result of the second operating portion of the user being unreliable.

20. The human computer interaction system according to claim 11, wherein the event is related to at least one command for controlling a virtual object in a virtual environment or a real object in a real environment.

* * * * *